United States Patent [19]

Rice

[11] E Re. 29,249

[45] Reissued June 7, 1977

[54] PRECAST CONCRETE BUILDING CONSTRUCTION

[75] Inventor: Edward K. Rice, Los Angeles, Calif.

[73] Assignee: Unicon Parking Structures, Inc., Van Nuys, Calif.

[22] Filed: Aug. 26, 1974

[21] Appl. No.: 500,650

Related U.S. Patent Documents

Reissue of:

[64] Patent No.: 3,744,200
Issued: July 10, 1973
Appl. No.: 837,986
Filed: June 2, 1969

[52] U.S. Cl. ..... 52/227; 52/236.5; 52/236.9

[51] Int. Cl.[2] ..... E04B 1/343; E04C 3/20

[58] Field of Search ..... 52/227, 236, 79, 602, 52/223, 133–135

[56] References Cited

UNITED STATES PATENTS

| | | | |
|---|---|---|---|
| 1,477,665 | 12/1923 | Richman | 52/227 |
| 2,340,263 | 1/1944 | Dodson | 52/227 |
| 3,260,025 | 7/1966 | Van der Lely | 52/228 |
| 3,495,367 | 2/1970 | Kobayashi | 52/223 |
| 3,503,170 | 3/1970 | Shelley | 52/227 |
| 3,894,373 | 7/1975 | Willingham | 52/236 |

FOREIGN PATENTS OR APPLICATIONS

| | | | |
|---|---|---|---|
| 865,652 | 2/1953 | Germany | 52/79 |

*Primary Examiner*—James L. Ridgill, Jr.
*Attorney, Agent, or Firm*—Lyon & Lyon

[57] ABSTRACT

A building construction utilizing precast concrete building units which are positioned side-by-side and end-to-end as well as stacked to form a multistory structure; the units being secured together by tendons freely threaded through horizontal and vertical chases provided in the building units, placed under tension and anchored at their extremities. The building units may also include precast beams containing longitudinal catenary tendons anchored at the end extremities of each building unit, the units being bolted in end-to-end relation.

24 Claims, 17 Drawing Figures

INVENTOR.
EDWARD K. RICE
BY
Lyon & Lyon
ATTORNEYS

INVENTOR.
EDWARD K. RICE
BY Lyon & Lyon
ATTORNEYS

INVENTOR.
EDWARD K. RICE
BY Lyon & Lyon
ATTORNEYS

INVENTOR.
EDWARD K. RICE
BY
Lyon & Lyon
ATTORNEYS

PRECAST CONCRETE BUILDING CONSTRUCTION

Matter enclosed in heavy brackets [ ] appears in the original patent but forms no part of this reissue specification; matter printed in italics indicates the additions made by reissue.

BACKGROUND OF THE INVENTION

Heretofore it has been the practice to embed steel reinforcing in concrete and establish an intimate bond between the reinforcing and concrete throughout the entire surface of the reinforcing. This practice has been followed in the techniques of pretensioning and post-tensioning of concrete. In the pretensioning technique, the reinforcing tendons are held in tension while the concrete is poured around the reinforcing. In the post-tensioning technique, the reinforcing tendons are jacketed in sleeves large enough to permit sliding movement of the tendons. Then, after the concrete is set, the tendons are tensioned, grouting is forced between the tendons and the sleeves so that the grouting is bonded to the tendons and the tendons are anchored at their extremities.

In all cases, there is a continuous intimate bond between the reinforcing or tendon and the concrete or grouting. If the concrete or grouting cracks, localized stress is applied to the reinforcing or tendon; that is, the reinforcing or tendon is stressed over the width of the crack (plus some relatively small bond length at each side of the crack). As a result, the crack need only widen a small amount to stretch the short length of the reinforcing or tendon beyond the yield point of the steel. If the force which caused the crack is relieved, the reinforcing or tendon does not recover, and the reinforcing or tendon exerts at least a local force tending to widen the crack.

Should the force which creates the crack or a later force be of sufficient magnitude, the crack may widen sufficiently that the localized stress in the reinforcing or tendon exceeds ultimate strength of the steel and a rupture occurs.

This problem is fully recognized so that in designing a concrete structure using ordinary reinforcing or tendon reinforcing, care is taken that the expected loads will be insufficient to produce the cracks. This, of course, materially increases the cost of construction, especially if the designer must consider gross overloads such as produced, for example, by earthquakes or falling aircraft.

SUMMARY OF THE INVENTION

The present invention is directed to a solution of the problem and involves other advantages as summarized in the following objects;

First, to provide a multistory building construction which utilizes precast building units arranged in end-to-end and side-by-side relation as well as stacked, which are connected by horizontal and vertical tendons slidably received in passageways and anchored only at their ends. As a result, the tendons are free to distribute throughout their length the force resulting from any change due to a crack or series of cracks. Thus, a crack of a width sufficient to fail a bonded tendon causes only minor stress change throughout the length of the unbonded tendon.

Second, to provide a multistory building structure as indicated in the preceding object which is portable; that is the building structure may be so arranged that the horizontal and vertical tendons may be removed and the building units separated for removal to another site, reassembled and reconnected by tension elements.

Third, to provide a building structure of the type indicated in the preceding objects wherein the precast building units may include longitudinally extending beams containing tendons disposed in catenary like contour, anchored at the ends of the building units and free to slide therebetween, said units being bolted end-to-end.

Fourth, to provide a building structure in which the building units may be portions of dwelling assemblies as exemplified in my copending application, Ser. No. 662,602, filed Aug. 23, 1967, for BUILDING STRUCTURE AND MEANS AND METHOD OF ITS MANUFACTURE, and in my copending application, Ser. No. 817,372, filed Apr. 18, 1969, for BUILDING ASSEMBLY AND METHOD, modified so as to be joined in the manner set forth in the other objects presented herein.

Fifth, to provide a building structure which may utilize novel building units especially adapted to produce a multideck parking structure.

Sixth, to provide a building structure wherein precast concrete building units involving a first set of slabs having marginal beams, a second set of slabs which further includes legs at the corners thereof and a third set of beam structures having a leg at each end thereof, the second set of slabs forming decks vertically spaced by said corner legs, the third set of slabs forming vehicle passageways between their end legs, and the first set of slabs forming decking bridging between said third set of slabs.

Figure 1:
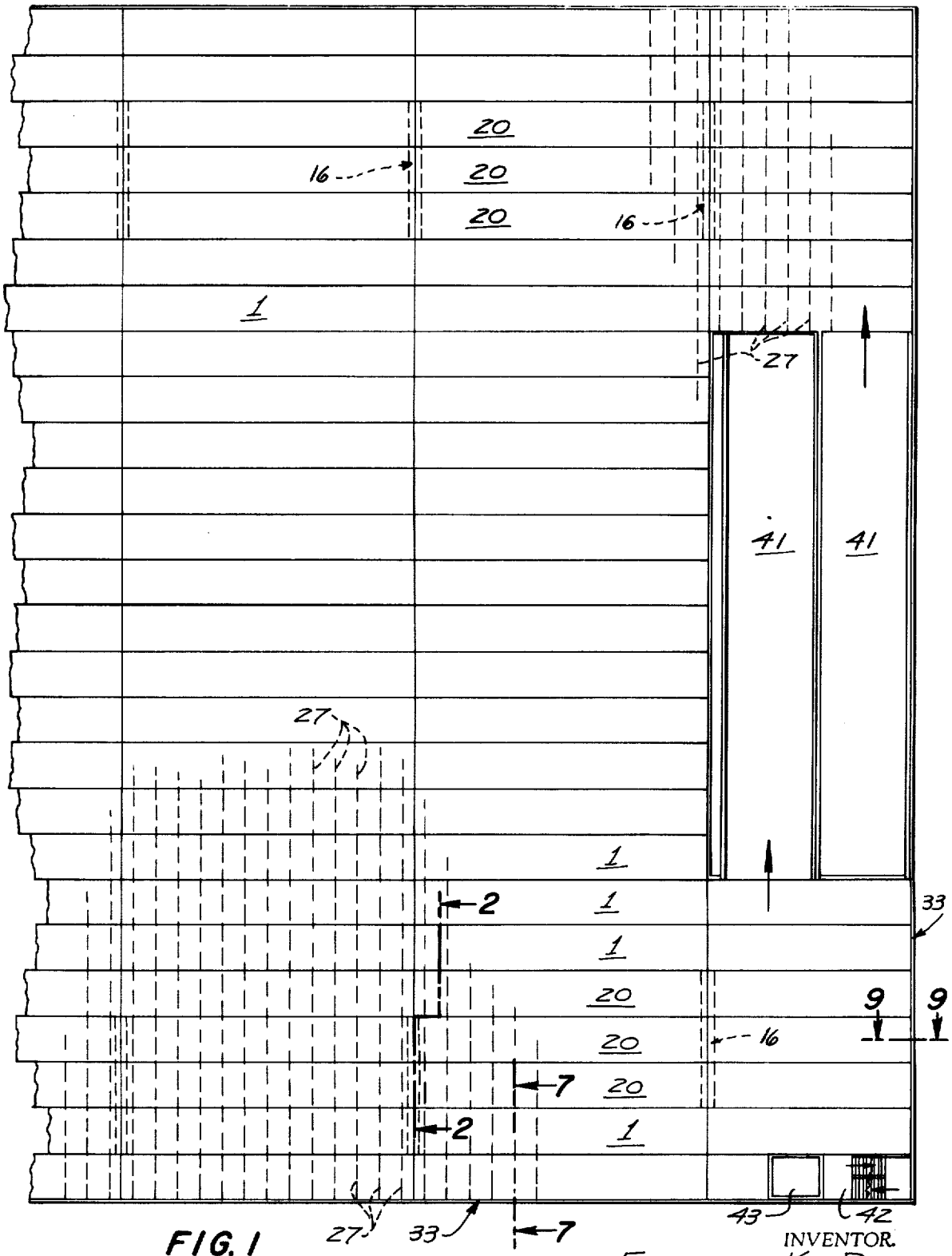
FIG. 1 is a plan view, showing a deck of the building construction as adapted for use as a multistory parking structure.

The building construction illustrated is a multilevel parking garage, and is constructed principally by the assembly of three sets of building units. The first set of building units, designated 1, includes an elongated rectangular slab or deck member 2, formed of reinforced concrete. The slab may also be termed a floor-ceiling slab, as it forms the ceiling of the level below and the floor of the level above. Depending from the slab, along the longer margins thereof, is pair of longitudinal beams 3. Transverse beams 4 are provided at the ends of the slab. Extending downwardly from the beams, at the corners of the slab, are legs 5.

The slab is provided with a set of transverse tendon passages 6. The legs are provided with vertical tendon passages 7. The longitudinal beams 3 are provided with tendon passages 8.

Several tendon passages may be provided in each beam and may merge at their central portions. The passages are curved, essentially in catenary profile. Each passage 8 receives a tendon 9, in the form of a steel cable, which extends through anchor plates 10 set in the ends of the longitudinal beams. The anchor plates are provided with tapered openings which receive anchor wedges 11 that grip the ends of the tendons.

The passages 8 may be formed in several ways, such as by a sleeve or liner cast in place, or by a rod of elastomeric material capable of being extracted after the concrete has been cast and set; or, the tendon itself may be coated with a lubricant, or encased in a sleeve. Regardless of the method employed, the tendon remains slidable in the passage so that the tendon may be post-tensioned by use of conventional pulling tools applied to the exposed extremities of the tendons. Later, the tendons are cut so that grout 12 may fill the recess in which the anchor plate is located.

Figure 16:
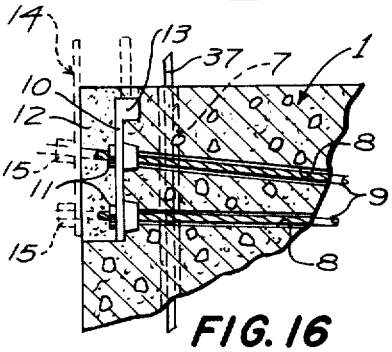
FIG. 16 is an enlarged fragmentary sectional view, taken through 16—16 of FIG. 2.

In order to handle the building unit, each anchor plate may be provided with a lifting boss 13, which may be grasped by a suitable lifting fitting, or may be internally screwthreaded to receive a lifting bolt. Alternatively, before the grout is applied, and the ends of the tendons trimmed, the protruding ends may receive lifting plates 14, held in place by removable clamping collars 15, all as indicated in FIG. 16.

Each of the second set of building units, designated 16, includes a beam 17, similar in depth but of greater width than the longitudinal beams of a first building unit. Each beam 17 is provided with longitudinal tendon passages, tendons and anchor plates as described in connection with the longitudinal beams 3. Each beam 17 is provided with end legs 18, similar to the corner legs 5, but having approximately twice the cross section. Also, each beam 17 is provided with side notches 19, intended to accommodate the ends of third building units 20. Each building unit 20 includes a slab 2, corresponding to the first building unit, as well as longitudinal beams 3; that is, the transverse end beams 4 and corner legs 5 are omitted. Also, the ends of the longitudinal beams are notched, as indicated by 21, in order to fit the notches 19 of the building unit 16.

Figure 2:
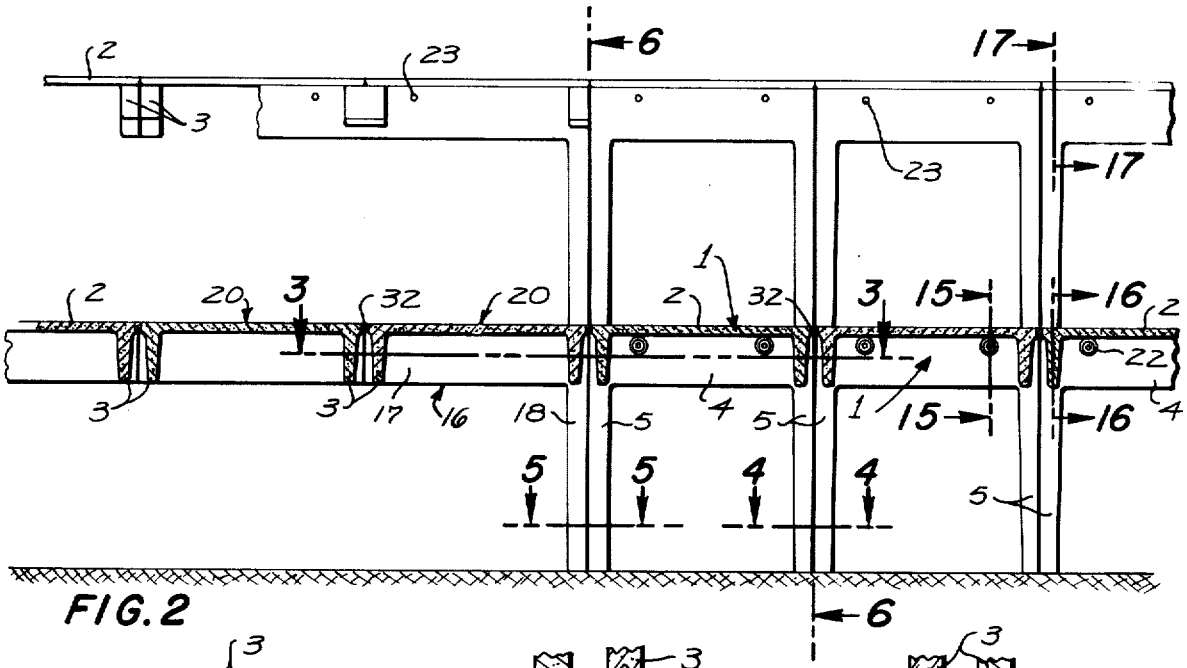
FIG. 2 is an enlarged fragmentary sectional view, taken in part through 2—2 of FIG. 1 rotated 90°, the view, illustrating a two-story parking structure.
Figure 3:
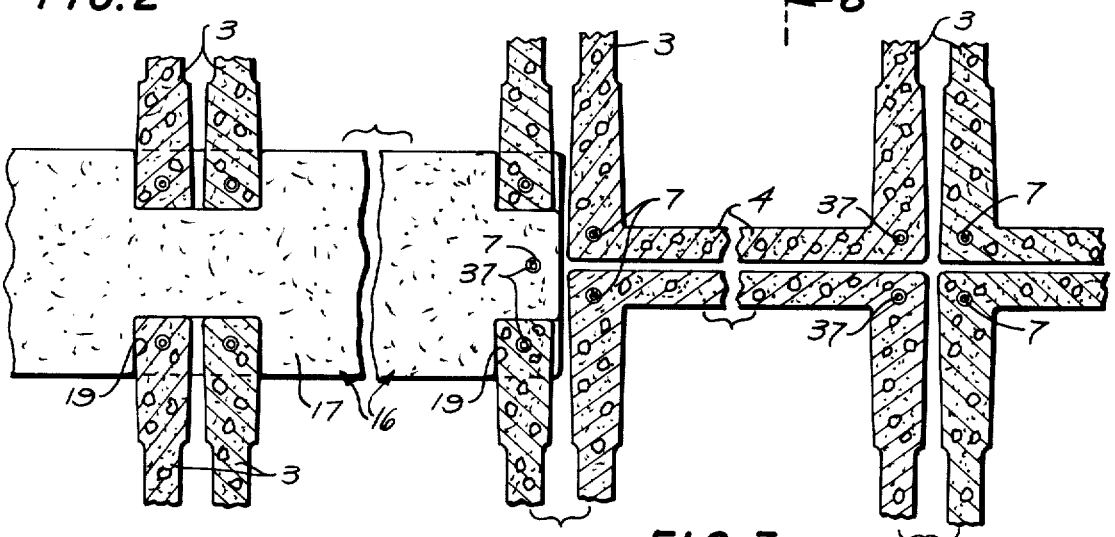
FIG. 3 is a further enlarged fragmentary sectional view, taken through 3—3 of FIG. 2, portions being shown in plan.
Figure 6:
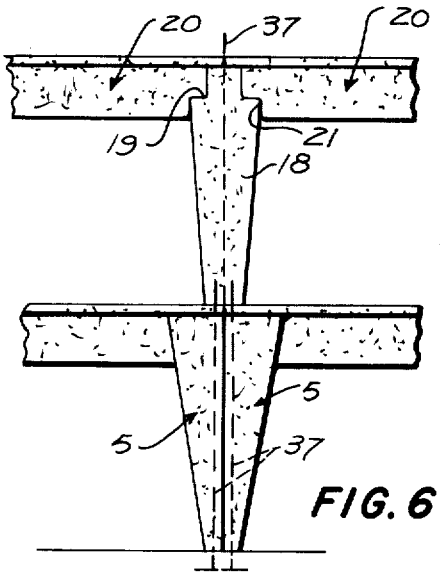
FIG. 6 is a fragmentary elevational view, taken from 6—6 of FIG. 2.
Figure 5:
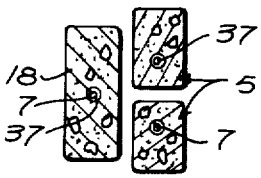
FIG. 5 is another sectional view, taken through 5—5 of FIG. 2.
Figure 4:
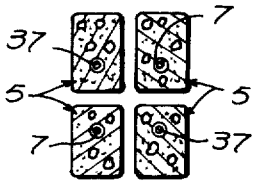
FIG. 4 is an enlarged sectional view, taken through 4—4 of FIG. 2.
Figure 7:
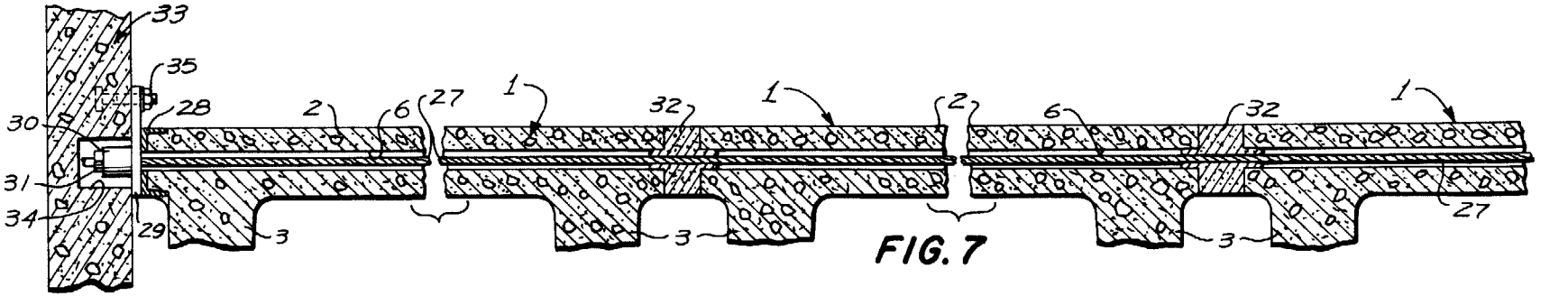
FIG. 7 is an enlarged fragmentary sectional view, taken through 7—7 of FIG. 1.
Figure 8:
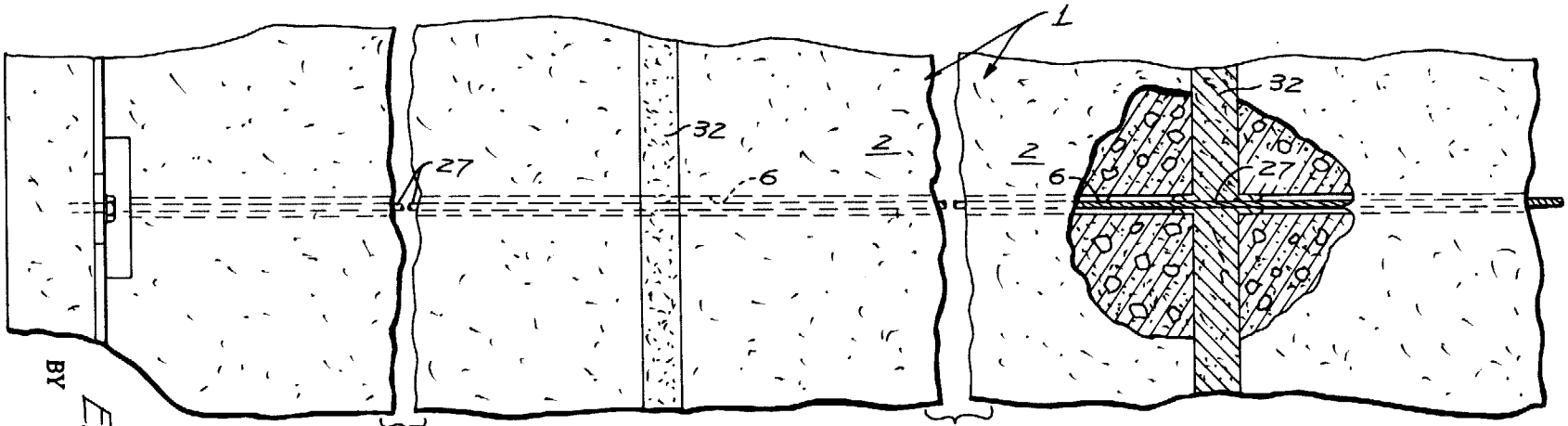
FIG. 8 is a fragmentary plan view of the portion of the building structure shown in FIG. 7.
Figure 10:
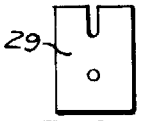
FIG. 10 is a side view of one of the anchor plates.

The three sets of building units are assembled by placing members of the first set of building units in end-to-end and side-by-side relation. It is impractical to make the building units 1 of sufficient width to provide space for vehicles between the corner legs at each end. However, the length of each building unit 1 is sufficient to accommodate two rows of parked cars and a passageway therebetween. In order to provide passageways parallel to the longitudinal axes of the building units 1, the second building units 16 are placed in lateral alignment with the adjacent ends of selected building units 1, and the building units 20 are placed between the beams 17 of the building units 16 and suitably secured thereto, thereby forming a deck which is a continuation of the deck formed by the slabs 2 of the first building units, as shown in FIGS. 1, 2 and 3.

Figure 15:
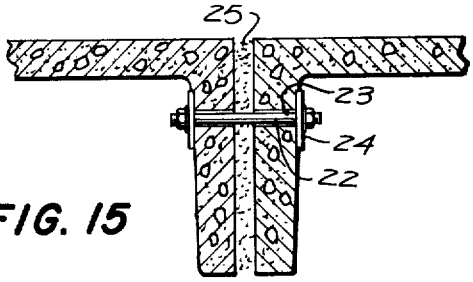
FIG. 15 is an enlarged fragmentary sectional view, taken through 15—15 of FIG. 2.

As shown in FIG. 15, the first building units are secured in end-to-end relation by tie bolts 22, which extend through openings 23 provided in the end beams 4. The tie bolts receive load distributing flanges 24. Before applying nuts to the ends of the tie bolts 22, grout 25 is forced in the space between the ends of adjacent units. It is preferred to provide such grout space rather than placing the building units in abutting relation as such spacing compensates for tolerance variations.

The building units 1 as well as the building units 20 are placed in side-by-side relationship in such a manner that their transverse tendon passages 6 are placed in alignment. The passages 6 may be circular, but to provide tolerance compensation, they may be oval or rectangular. Each aligned row of passages 6 receives a transverse tendon 27, which extends continuously from one outside edge to the opposite outside edge of the building structure. The building units forming such edges are provided with exposed metal channel members 28 bonded to the concrete as well as secured by suitable reinforcing, now shown. Each end channel is perforated to receive an end of the corresponding tendon. An anchor plate 29, perforated to receive the corresponding tendon, overlies the end channel 28. Mounted on each anchor plate or arranged to bear thereagainst is a wedge collar 30, which receives a set of conical wedges 31 adapted to grip and hold the tendon under tension.

As is the case between the ends of the building units, the sides thereof are not placed in mutual contacting relation, but space is provided therebetween to compensate for tolerance variations. Such spaces also aid in insertion or threading of the tendons 27 into the passages 6. For, in the case of partial misalignment, the end of the tendon may be guided into alignment with a succeeding passage. After the tendons 27 have been inserted, and before tension is applied, grout 32 is forced into the spaces between the sides of the building units. Temporary forms may be inserted upwardly between adjacent longitudinal beams 3 so as to retain the grout 32 in the space provided. It should be noted that the tendons 27 are thoroughly greased or otherwise coated so that any bond between the tendons 27 and the grout is minimized.

It should be further noted that the grout 25 and 12 preferably contains an expansive cement, such as the cement disclosed in U.S. Pat. Nos. 3,215,701 and 3,303,037. The grout mixture is compounded so that it swells slightly or at least compensates for any shrinkage that would otherwise occur so that on tensioning the tendons 27, there is no significant reduction in the overall distance between the extreme building units.

Figure 9:
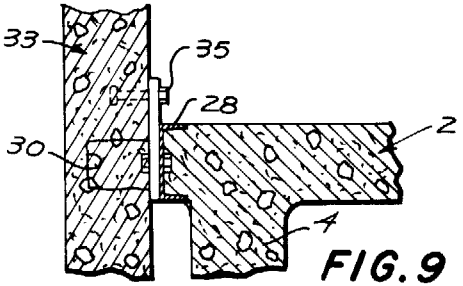
FIG. 9 is an enlarged fragmentary sectional view, taken through 9—9 of FIG. 1.
Figure 11:
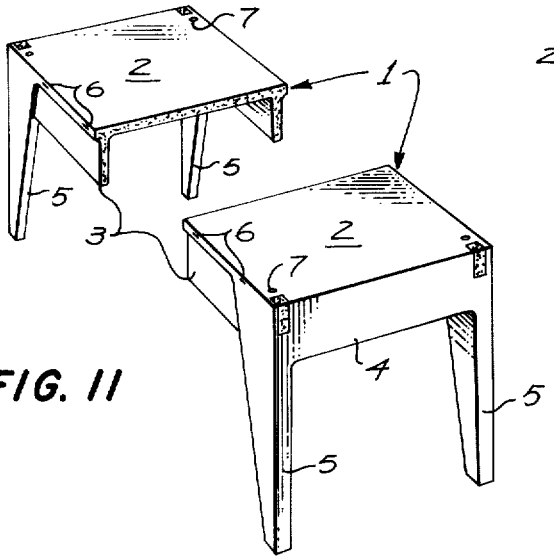
FIG. 11 is a fragmentary perspective view, showing one of the building units used in the building construction.
Figure 12:
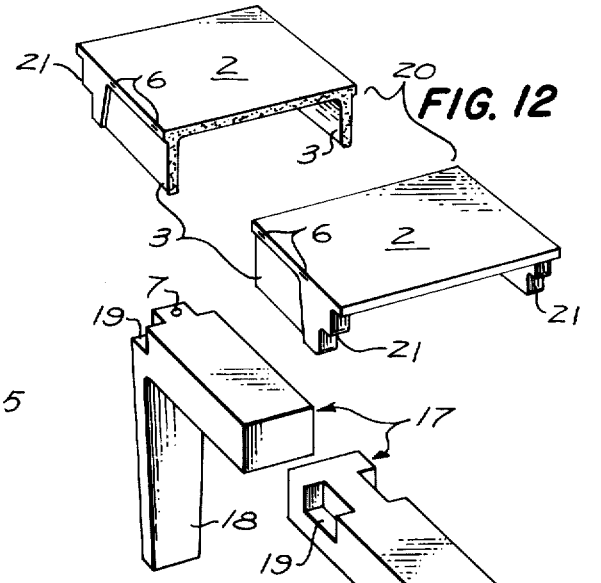
FIG. 12 is a fragmentary perspective view, showing another of the building units.
Figure 13:
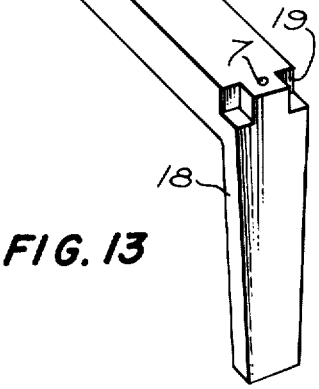
FIG. 13 is a fragmentary sectional view, showing another of the building units.

Each anchor plate 29 may also serve to support in part a fence wall unit 33, each fence wall unit consisting essentially of a rectangular concrete slab having sockets 34 to clear the wedge collars 30, and also provided with mounting bolts 35 which are received in slots provided in upper portions of the anchor pates 29, which portions project above the slab 2. At the end extremities of the building units forming the ends of the building, mounting plates identical to the anchor plates 29 may be used and may be bolted to the end channel members 28, as indicated in FIG. 9.

Figure 14:
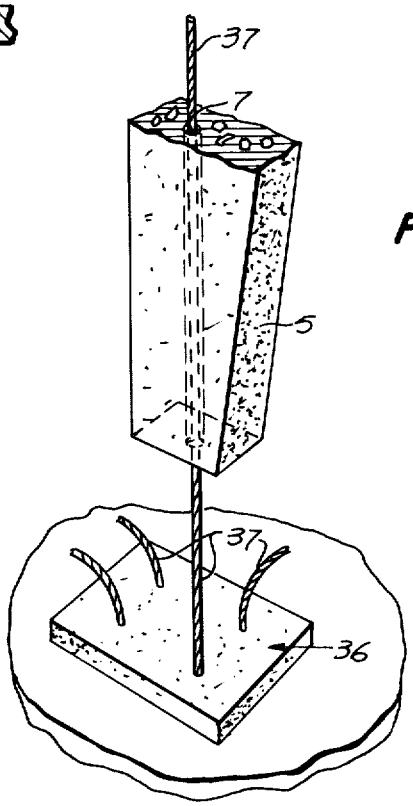
FIG. 14 is a fragmentary perspective view, showing a supporting leg and a portion of the foundation as well as a vertical tendon, the leg being separated from the foundation to illustrate the construction.
Figure 17:
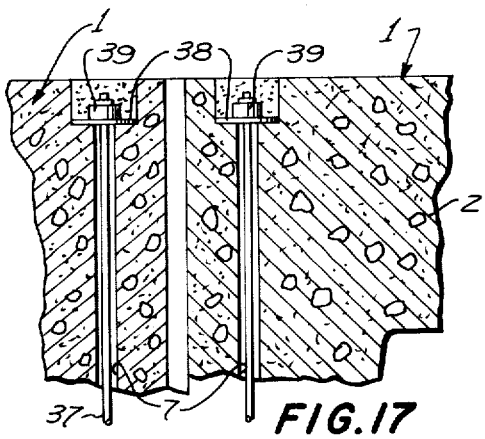
FIG. 17 is an enlarged fragmentary sectional view, taken through 17—17 of FIG. 2.

The building units legs 5 and 18 of the lower or first level of building units rest on appropriate foundation piers 36, indicated in FIG. 14. Vertical tendons 37, having conventional fixed anchorages, are secured in the foundation piers 36 and extend upwardly therefrom. The vertical tendons 37 are anchored at the time the foundation is poured, and are initially formed in coils until assembly of the building construction is undertaken. The building units 1 and 16 are poised above the foundation piers and the vertical tendons are threaded therethrough; that is, the end legs 18 and corner legs 5 are threaded downward on the vertical tendons, the tendons being received in the vertical tendon passages 7. After the building units have been assembled, anchor plates 38 are fitted over the protruding upper ends of the vertical tendons and appropriate wedge collars 39 and wedges 40 are applied, and the tendons are tensioned in a conventional manner. It is preferred, of course, to place the anchor plates 38, wedge collars 39 and wedges 40 below the upper surface of the upper deck of the structure so that the upper deck is free for use for parking purposes.

The parking structure includes appropriately located ramps 41 which may be formed of modifications of the building units described, or may be conventional in construction. Also, suitable stairways 42 and elevator shafts 43 are provided.

It should be noted that each of the building units contain conventional reinforcing, not shown, in addition to the tendon reinforcing described. Also, if desired, the building units may contain expansive cement capable of stressing the reinforcing, or to compensate for shrinkage, or conventional cement may be used. While use in the individual units of reinforcing bonded to the concrete does create a localized stress condition in the reinforcing, the problem is not as severe as would be the case with the building as a whole.

It will also be noted that where the ramps 41 would interfere, the tendons 27 terminate at the ramps.

While a two story parking structure is indicated, the structure may be extended to greater height.

Should it be desired to do so, the building construction may be disassembled. That is, the tendons 27 may be removed as well as the bolts 22, and the top anchors 39. Then, the building units may be removed, those units having legs being raised from the tendons 37. The grout 25 and 32 is first removed, or, if it is intended to provide for later disassembly, the contacting surfaces of the building units are provided with a suitable parting agent; or, a non-adhering material is substituted for the grout. In this regard, it should be noted that the grout is maintained under compression so that there is no need for a bond with the building units.

A known property of conventional concrete has been that if a concrete slab is sufficiently compressed in two directions within the plane defined by the slab, the slab becomes waterproof; that is, water does not penetrate from one surface through the slab to the opposite surface. The required compressive force has been determined to be about 300 psi in each direction. Such compression has been attained by sets of tendons extending in each direction, which have been post-tensioned. If expansive cement, such as that disclosed in U.S. Pat. Nos. 3,215,701 and 3,303,037, is used, part of such compression is attained by the interaction of the reinforcing as more fully disclosed in the aforementioned Pat. application, Ser. No. 662,602. In this case, less supplementary post-tensioning force, for example, is required in order to attain the waterproof condition.

It has been accepted that in order to attain such waterproof condition the compression loads must be applied simultaneously or nearly so and soon after the concrete has attained proper strength.

It has been found in the course of developing the present invention, that the compression loads need not be applied as nearly simultaneously as possible or as soon as possible after casting. Instead, it has been found that the longitudinal tendons 9 in each building unit may be post-tensioned at any convenient time; further, the building units may be stored for a long period before being assembled into the building structure and subjected to the transverse compression force exerted by the tendons 27 and when finally compressed in the order of 300 psi in the two axes, the slab becomes watertight.

Also previously it has been considered essential that the compressive forces be confined to a single monolithic unit; whereas, it has been found that a large number of slabs placed side-by-side may be compressively stressed by a series of tendons threaded therethrough and be rendered watertight.

With regard to the grout, if this includes a conventional portland cement base with or without expansible ingredients, it has been found that if compressed in the order of 300 psi in a single transverse axis between the ends or the sides of the slabs, it as well as the interfaces between the grout and the slabs becomes watertight.

While particular embodiments of this invention have been shown and described, it is not intended to limit the same to the details of the constructions set forth, but instead, the invention embraces such changes, modifications and equivalents of the various parts and their relationships as come within the purview of the appended claims.

I claim:

1. A multiple story garage structure, comprising:

a. a first set of precast concrete building units, each unit thereof including an elongated rectangular slab and legs at the ends thereof, the slabs *having substantially continuous upper and lower surfaces except for vertical tendon passages at said legs and* being arranged *coplanar* in side-by-side and end-to-end relation and the legs disposed in rows under the ends of the slabs, the rows of legs defining therebetween rows of parking spaces adjacent the legs and access lanes between the parking spaces;

b. a second set of precast concrete building units, each unit of the second set including a beam and a leg at each end thereof, the members of the second set of building units being disposed in longitudinal alignment with the rows of legs of the first set at the ends thereof to define transversely extending corridors connecting the access lanes;

c. a third set of precast concrete building units, each unit of the third set including a slab and at least one beam thereunder, the ends of the members of the third set of building units resting on the beams of the second set of building units and continuing in *coplanar* side-by-side and end-to-end relation from the slabs of the first set of building units;

d. and means securing the sets of building units in their assembled relation.

2. A building construction, as defined in claim 1, wherein:

a. said building units are adapted to be stacked to form a multideck structure;

b. said legs are provided with vertical tendon guideways adapted to be aligned when said building units are stacked;

c. and said securing means includes *steel cable* vertical tendons slidably received in said aligned vertical guideways, and anchor means are provided at the extremities of said tendons to hold said vertical tendons under tension, thereby to exert a compressive force between the vertically stacked building units, said vertical tendons being freely movable in their respective passageways between their respective anchors whereby tension loads thereon are uniformly distributed along the length of each vertical tendon.

3. A building construction, as defined in claim 1, wherein:

a. each slab defines a plurality of horizontal tendon guideways, disposed *between their upper and lower surfaces and* in alignment with guideways of adjacent slabs, when the slabs are assembled in side-by-side relation;

b. and said securing means includes *steel cable* tendons slidably received in the guideways of a plurality of slabs, and anchors at the remote ends of the tendons to hold said tendons under tension thereby to exert a compressive force between slabs located between said anchors, said tendons being freely movable in said guideways between said anchors whereby tension loads are uniformly distributed along the length of each tendon.

4. A building construction, as defined in claim 3, wherein:

a. the slabs of said building units are initially disposed in spaced relation;

b. grout including expansive cement occupies said spaces to exert an expansive force between said slabs;

c. and said tendons exert a compressive force on the grout compensating for the expansive force of said grout.

5. A horizontal multiple deck construction, comprising:

a. a set of elongated concrete slabs for each deck arranged in coplanar relation with their side edges in contiguous relation to form a plurality of continuous junctures between their side edges;

b. *longitudinally extending* deflection resisting beams integral with corresponding slabs [;] , *the slabs, except for said longitudinal beams defining between their ends essentially parallel upper and lower surfaces;* c. integral legs at the ends of the beams for supporting each deck above the deck below;

d. each set of slabs having a plurality of horizontal transversely extending parallel guideways disposed *in a zone between their upper and lower surfaces and* in alignment across the junctures and through a plurality of slabs;

e. a plurality of continuous slab connecting *steel cable* flexible tendons, slidable in and coextensive with the guideways in each deck;

f. anchoring means secured to the ends of the tendons of each deck to maintain predetermined uniformity of distributed tension loads throughout the lengths of the tendons thereby to maintain corresponding compression loads *in and parallel to the common zone of the tendons between the upper and lower surfaces of the slabs and* distributed throughout the slabs disposed between the anchors as well as the junctures between contiguous slabs, the tension loads being of sufficient magnitude to secure the slabs against relative movement at their junctures, thereby to cause the slabs to resist deflecting forces as a unit;

g. the legs extending between the decks being disposed in vertically aligned groups and each leg forming a juncture with a slab of the deck below;

h. a pier below the lowermost leg of each group and forming a horizontal juncture therewith;

i. each group of legs, the corresponding ends of the beams and the slabs therebetween having vertical guideways extending from the piers therethrough;

j. flexible tendons extending through the vertical guideways;

k. and anchoring means in said piers and bearing against the slabs of the top deck secured to the vertical tendons to maintain a predetermined uniformity distributed tension loads throughout the lengths of the vertical tendons thereby to maintain compression loads distributed throughout the legs, beam ends and slabs disposed between the anchors as well as the horizontal junctures therebetween to cause the decks to resist deflection forces as a unit.

6. A multiple story building construction, comprising:

a. at least four building units forming a lower story; each unit including a horizontal rectangular concrete slab *defining upper and lower surfaces and* having a major longitudinal and a minor lateral dimension, underlying supporting beams extending longitudinally of the slabs between the ends thereof and spaced vertical concrete legs fixed to the ends of the slabs;

b. the four units being assembled with the slabs in a common horizontal plane and with the ends of the slabs in abutting relation on *at least a* first vertical plane [s] , the adjacent longitudinal edges of adjacent slabs likewise being in abutting relation on *at least a* second vertical plane [s] at right angles to the first named plane [s] ;

c. foundation means serving to engage and support the lower ends of the vertical legs;

d. at least four building units assembled upon the first four units and forming a second story;

e. the units of the second story likewise each including a horizontal rectangular concrete slab *defining upper and lower surfaces and* having a major longitudinal and a minor lateral dimension, underlying supporting beams extending longitudinally of the slabs between the ends thereof, and spaced vertical concrete legs fixed to the end portions of the slabs;

f. the four units of the second story being assembled with their slabs in a common horizontal plane and with the adjacent ends of the slabs in abutting relation on said first vertical plane [s] and the longitudinal edges of adjacent slabs being in abutting relation on said second vertical plane;

g. the vertical legs for the upper story having their lower ends seated upon end portions of an underlying slab and in vertical alignment with legs for the lower story;

h. the space between vertical legs of a story as measured longitudinally of the units being substantially unobstructed to form free corridors;

i. the legs for adjacent ends of units for the second story being disposed adjacent and on opposite sides of a corresponding first plane;

j. the slabs of the units forming both the lower and upper stories having aligned horizontal tendon accommodating guideways *occupying a common zone between the upper and lower surfaces of the slabs and* extending laterally through the same from one remote longitudinal side edge of a slab to the remote other side edge;

k. the end portion of each slab of the units forming both the lower and upper stories having a vertical tendon accommodating guideway extending through the same and through a corresponding vertical leg;

l. the vertical guideways of the units forming the upper floor being aligned with the vertical guideways of the units forming the lower story;

m. tensioned horizontal *steel cable* tendons extending through the horizontal guideways of the slabs and tendon anchors at the remote side edges of the slabs thereby serving to apply forces in compression to the slabs *centered in the common zone of the horizontal guideways thereby* causing mutual engagement of their intermediate longitudinal edges;

n. tensioned *steel cable* tendons extending through the aligned vertical guideways and tendon anchors in the foundation means and upper story serving to apply forces in compression to the vertical legs and to the corresponding portions of the slabs engaged thereby;

o. the portions of the horizontal tendons intermediate their extremities being free of force transmitting attachment with the slabs through which they extend;

p. the portions of the vertical tendons intermediate the foundation means and their upper extremities being free of force transmitting attachment with the legs and slabs through which they extend;

q. and means securing adjacent ends of the slabs together.

7. A multiple deck structure, comprising:

a. a set of elongated concrete modules, each module including a horizontally extending slab *defining upper and lower surfaces*, at least one beam extending between the ends of the slab, at least one vertically extending leg adjacent each end of the beam;

b. each module having a vertical tendon guideway extending continuously through each leg, beam and slab, the modules being stacked with their respective vertical guideways in vertical alignment, and the modules having areas of mutual engagement between the extremities of their legs and the slabs of vertically adjacent modules;

c. continuous *flexible steel cable* tendons slidable in the aligned guideways;

d. and tendon anchoring means at the upper and lower extremities of the guideways bearing against the modules for applying vertical tension to the tendons and vertical compression loads to the extremities of the slabs and beams and longitudinally of the legs as well as the areas of mutual engagement, thereby securing said areas against relative displacement and increasing resistance of the slabs, beams and legs to bending loads.

8. A multiple deck structure, as defined in claim 7, wherein:

a. the lower tendon anchoring means includes foundation piers disposed under the legs of the lowermost modules;

b. and the tendons for each stack of modules are adapted to be threaded through the guideways in sequence as the modules are placed in stacked relation.

9. A horizontal deck construction, comprising:

a. a set of elongated concrete slabs *defining essentially parallel upper and lower surfaces and* arranged in coplanar relation with their side edges in contiguous relation to form a plurality of junctures coextensive with the side edges;

b. the slabs having a plurality of parallel, aligned tendon guideways *disposed in a common zone between the upper and lower surfaces of the slabs and* extending continuously through the set of slabs transverse to said junctures;

c. a plurality of continuous slab connecting *steel cable* flexible tendons *in the common zone of the guideways, and* slidable in and coextensive with the guideways;

d. anchoring means engaging the tendons and fixed to the slabs at the ends of the guideways the anchoring means maintaining predetermined tension loads on the tendons and corresponding compression loads in the slabs, including the junctures therebetween *also centered in the common zone of the guideways and said compression loads being* of sufficient magnitude to secure the slabs against relative movement at their junctures thereby to cause the slabs to resist deflection forces as a unit;

e. and a set of deflection resisting slab supporting beams underlying the slabs and extending parallel to the junctures, the beams being in rigid relation to the slabs and cooperating therewith to support loads as a unit.

10. A construction, as defined in claim 9, wherein:

a. said anchoring means are removable from the tendons and the tendons are removable from the slabs to permit disassembly of the slabs thereby to permit removal to another site for reassembly.

11. A construction, as defined in claim 9, wherein:

a. supporting legs extend vertically from the ends of each beam to form with the set of beams and corresponding set of slabs a set of coplanar building units;

b. and the sets of building units are stacked vertically to form a multiple story structure.

12. A multiple story structure, as defined in claim 11, wherein:

a. a first set of tendon anchoring means underlie the supporting legs of the lowermost set of building units;

b. junctures are formed between the members of each stack of building units;

c. the supporting legs, beams and slabs of each stack of building units have vertical tendon guideways extending continuously between the tendon anchoring means and the top of the multiple story structure;

d. a plurality of vertical tendons are secured to the first set of tendon anchoring means and are slidable in the vertical guideways;

e. and a second set of tendon anchoring means engage the upper ends of the tendons and are fixed to the top of the multiple story structure to maintain vertical tension loads on the tendons and corresponding vertical compression loads on the members of each stack of building units as well as the junctures therebetween to secure the members against relative movement at their junctures thereby to cause the members of each stack of building units to resist deflection forces as a unit.

13. A construction, as defined in claim 12, wherein:

a. the anchoring means for the slab connecting tendons are removable therefrom, and the tendons are removable from the slabs to permit disassembly;

b. at least the second act of anchoring means for the vertical tendons are removable therefrom to permit disassembly of each stack of building units, whereby the building units may be removed to another site for reassembly.

*14. A horizontal deck construction, as defined in claim 9, wherein:*

*a. the side edges of the slabs are initially disposed in spaced relation;*

*b. and grout is received in the spaces between the slabs and around the portions of the tendons traversing said spaces:*

*15. A horizontal deck structure, as defined in claim 14, wherein:*

*a. the grout includes expansive cement to exert an expansive force between the slabs.*

*16. A slab structure, comprising:*

*a. a plurality of elongated slab members having essentially planar upper and lower surfaces and being arranged with their side edges in side-by-side relation to form a slab set;*

*b. means for supporting the members of the slab set in coplanar relation;*

*c. each slab member having a plurality of transverse parallel coplanar tendon guideways distributed between said upper and lower surfaces;*

*d. the tendon guideways of the slab members forming the slab set being in alignment between and including the remote slab members of the slab set;*

*e. a plurality of steel cable tendons coextensive with the slab set and maintained slidably received in the guideways;*

*f. and anchoring means fixed to the end slab members of the slab set and engaging the tendons to apply a predetermined distributed tension force thereto throughout the slab set and a corresponding uniform transverse compression force to all the slab members of the slab set, the tendons remaining free to slide relative to their guideways to maintain such uniform distribution of tension and compression while permitting change in the dimensions of the slab set caused by external forces.*

*17. A slab structure, as defined in claim 16, wherein:*

*a. grout is disposed between the side edges of the slab members of the slab set and around the portions of tendons traversing the grout between the slab members, the tendons being slidable with respect to the grout as well as the guideways to permit and maintain distributed tensioning of the tendons.*

*18. A slab structure as defined in claim 17, wherein:*

*a. the grout includes expansive cement to exert an expansive force between the slab members of the slab set.*

*19. A slab structure, as defined in claim 16, wherein:*

*a. supporting cross beams underlie a selected number of the slab members of the slab sets at the ends thereof.*

*20. A slab structure, as defined in claim 17 wherein:*

*a. legs are provided at the ends of each cross beam;*

*b. and other legs are provided under the ends of selected other slab members of the slab set to elevate the slab set.*

*21. A slab structure, as defined in claim 16, wherein:*

*a. the slab set is provided with a plurality of underlying reinforcing beams integral with and extending longitudinally with respect to the slab members.*

*22. A slab structure as defined in claim 19, wherein:*

*a. each longitudinal beam includes at least one tendon extending the length thereof, and tendon anchors at the ends thereof.*

*23. A slab structure as defined in claim 19, wherein:*

*a. selected slab members include integral depending legs underlying selected beams.*

*24. A slab structure, as defined in claim 23, wherein:*

*a. a plurality of slab sets are stacked to form a plurality of floors;*

*b. the depending legs of each floor are disposed in vertical alignment, and include continuous vertically aligned tendon guideways extending through the legs and corresponding slab members.*

* * * * *